United States Patent Office 3,535,344
Patented Oct. 20, 1970

3,535,344
3,4-CIS-4-ARYL-ISOFLAVANES
Klaus Irmscher, Darmstadt-Eberstadt, Josef Krämer, Darmstadt, Hans-Gunther Kraft, Darmstadt-Eberstadt, and Hartmut Kieser, Darmstadt, Germany, assignors to E. Merck A.G., Darmstadt, Germany
No Drawing. Filed Feb. 13, 1967, Ser. No. 615,391
Claims priority, application Germany, Feb. 16, 1966, M 68,414
Int. Cl. C07d 7/20
U.S. Cl. 260—345.2                                   7 Claims

ABSTRACT OF THE DISCLOSURE 3,4-cis-4-phenyl-isoflavane and derivatives thereof suitable for, inter alia, antifertility applications.

---

Applicants hereby claim the benefit of the filing date of German patent application Ser. No. M 68,414, filed Feb. 16, 1966.

This invention relates to 3,4-cis-4-phenyl-isoflavane and derivatives thereof.

An object of this invention is to provide novel chemical compounds and pharmaceutical compositions based thereon.

Another object is to provide processes for the production of the novel compounds of this invention, as well as the novel intermediates obtained in such processes.

A further object is to provide processes for effecting sex hormone activity, particularly female sex hormone activity, and especially anti-fertility activity in mammals.

A still further object is to provide cholesterol-level-lowering drugs and processes for administering same to mammals.

Upon further study of the specification and claims, other objects and advantages of the present invention will become apparent.

For the attainment of the above objects, there are provided compounds of Formula I, as follows:

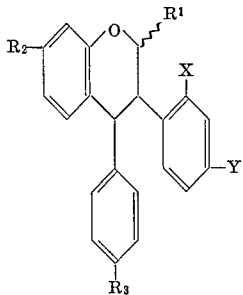

wherein $R_1$ represents H or alkyl of 1-3 carbon atoms;
$R_2$ and $R_3$, being the same or different, each represent H, OH, alkoxy, or acyloxy of 1-6 carbon atoms, —O—$(CH_2)_n$—$NR_4R_5$, —$OSO_3H$, —$OPO_3H_2$, or —$OCH_2COZ$;
$R_4$ and $R_5$, being the same or different, each represent alkyl of 1-4 carbon atoms or, together with the N-atom, a 5- or 6-membered heterocyclic ring;
X and Y, being the same or different, each represent H or F;
Z represents OH, alkoxy of 1-6 carbon atoms, $NH_2$, or an alkylated amino group of 1-6 carbon atoms, the latter being optionally part of a heterocyclic ring; and
$n$ is 2 or 3, as well as the physiologically acceptable acid addition, ester, and quaternary ammonium salts of these compounds.

The above compounds are efficacious anti-fertility agents. Furthermore, they also exhibit estrogenic or anti-estrogenic, gonadotropin-inhibiting, ovulation-stimulating, and hypocholesterolemic effects, but, of course, routine experimentation is required to find the necessary dosages for such opposite effects as estrogenic and anti-estrogenic. The compounds of Formula I and the above-mentioned salts thereof can be employed as medicine in administration to mammals. They can also be employed as intermediates for the production of other drugs by the use of conventional reaction steps of organic synthesis.

The anti-fertility effect was tested according to a method similar to that described in Journal of Reproduction and Fertility, vol. 5, p. 239 (1963).

A process for the production of the 3,4-cis-4-aryl-isoflavanes of Formula I, as well as the physiologically acceptable acid addition, ester, and quaternary ammonium salts thereof, comprises treating a 3-isoflavene of Formula II:

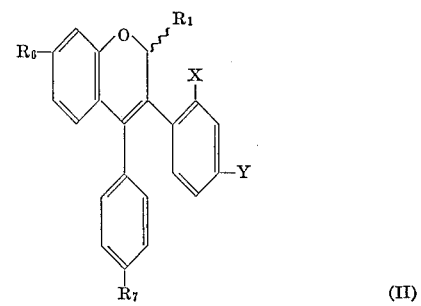

wherein $R_6$ and $R_7$ represent functionally modified hydroxy groups, or $R_2$ and $R_3$, respectively, with hydrogen, in the presence of a catalyst.

As subordinate reactions, functionally modified hydroxy groups can be liberated by treatment with hydrolyzing or hydrogenolyzing agents; and/or free hydroxy groups can be reacted with alkylating or acylating agents; and/or compounds of Formula I by treatment with acids or bases or alkylating agents can be converted into the physiologically acceptable acid addition or ester salts or quaternary ammonium compounds thereof, respectively.

The wavy line in the 2-position means that the residue $R_1$, with respect to the two aryl residues in the 3- and 4-positions, can be cis-positioned as well as trans-positioned.

Preferred alkyl groups embraced by the residue $R_1$ are methyl, ethyl, n-propyl, and isopropyl; preferred alkoxy groups embraced by the residues $R_2$, $R_3$, and Z are, for example, methoxy, ethoxy, propoxy, isopropoxy, n-butoxy, isobutoxy, sec.-butoxy, tert.-butoxy, amyloxy, isoamyloxy, hexyloxy, and isohexyloxy. When $R_2$ or $R_3$ represent acyloxy, preferred groups include formyloxy, acetoxy, propionyloxy, butyryloxy, isobutyryloxy, valeryloxy, isovaleryloxy, caproyloxy, picolinoyloxy, nicotinoyloxy, or isonicotinoyloxy, the acyl moiety being preferably that of a carboxylic acid, particularly a hydrocarbon carboxylic acid.

The group —O— $(CH_2)_n$—$NR_4R_5$ especially represents 2-dimethylamino-ethoxy, 2-diethylaminoethoxy, 2-dipropylaminoethoxy, 2 - di-n-butylaminoethoxy, 2-pyrrolidinoethoxy, 2-piperidinoethoxy, 2-morpholinoethoxy, 2-(N - methylpiperazino) - ethoxy, 3-dimethylaminopropoxy, 3-diethylaminopropoxy, 3 - pyrrolidinopropoxy, 3-piperidinopropoxy, or 3-morpholinopropoxy.

The group Z preferably represents, in addition to OH, alkoxy, and $NH_2$, such alkylated amino moieties as methylamino, dimethylamino, diethylamino, pyrrolidino, piperidino, and morpholino.

The residues $R_6$ and $R_7$ can also be represented by OH groups present in a functionally modified form which can be conventionally split under hydrolyzing or hydrogenolyzing conditions. Preferred are benzyloxy and tetrahydropyranyloxy, in addition to lower acyloxy groups, such as those mentioned above.

The 4-aryl-isoflavanoids of Formula I are obtainable by catalytic hydrogenation of 3-isoflavenes of Formula II. Particularly preferred isoflavenes of Formula II include the following:

4-phenyl-,
4-anisyl-,
4-(p-2-dimethylaminoethoxyphenyl)-,
4-(p-2-diethylaminoethoxyphenyl)-,
4-(p-2-pyrrolidinoethoxyphenyl)-,
4-(p-2-piperidinoethoxyphenyl)-,
4-(p-2-morpholinoethoxyphenyl)-,
4-(p-3-dimethylaminopropoxyphenyl)-,
4-(p-3-diethylaminopropoxyphenyl)-,
4-(p-3-pyrrolidinopropoxyphenyl)-,
4-(p-3-piperidinopropoxyphenyl)-,
4-(p-3-morpholinopropoxyphenyl)-,
4-(p-tetrahydropyranyl-2-oxyphenyl)-,
4-(p-benzyloxyphenyl)-; and
4-(p-hydroxyphenyl)-derivatives of 3-isoflavene,
2-methyl-,
2-ethyl-,
7-methoxy-,
2-methyl-7-methoxy-,
2-ethyl-7-methoxy-,
7-benzyloxy-,
2-methyl-7-benzyloxy-,
2-ethyl-7-benzyloxy-,
7-hydroxy-,
2-methyl-7-hydroxy-,
2-ethyl-7-hydroxy-,
7-(tetrahydropyranyl-2-oxy)-,
2-methyl-7-(tetrahydropyranyl-2-oxy)-,
2-ethyl-7-(tetrahydropyranyl-2-oxy)-,
2'-fluoro-,
2-methyl-2'-fluoro-,
2-ethyl-2'-fluoro-,
7-benzyloxy-2'-fluoro-,
2-methyl-7-benzyloxy-2'-fluoro-,
2-ethyl-7-benzyloxy-2'-fluoro-,
4'-fluoro-,
2-methyl-4'-fluoro-,
2-ethyl-4'-fluoro-,
7-benzyloxy-4'-fluoro-,
2-methyl-7-benzyloxy-4'-fluoro,
2-ethyl-7-benzyloxy-4'-fluoro-,
7-methoxy-2'-fluoro-,
2-methyl-7-methoxy-2'-fluoro,
2-ethyl-7-methoxy-2'-fluoro-,
7-methoxy-4'-fluoro-,
2-methyl-7-methoxy-4'-fluoro-,
2-ethyl-7-methoxy-4'-fluoro-,
7-(tetrahydropyranyl-2-oxy)-2'-fluoro-,
2-ethyl-7-(tetrahydropyranyl-2-oxy)-4'-fluoro-,
7-(tetrahydropyranyl-2-oxy)-4'-fluoro-,
2-methyl-7-(tetrahydropyranyl-2-oxy)-4'-fluoro-, and
2-ethyl-7-(tetrahydropyranyl-2-oxy)-4'-fluoro-3-isoflavene.

These compounds can be produced conventionally by reacting the corresponding isoflavanones with the corresponding organometallic compounds and subsequent liberation of water (cf., f.e., Belgian Pat. 674,534).

Suitable catalysts for the catalytic hydrogenation of the compounds of Formula II are, for example, noble metal, nickel, and cobalt catalysts. The noble metal catalysts can be employed in the form of supported catalysts, (e.g., palladium on charcoal, calcium carbonate, or strontium carbonate) as oxide catalysts, e.g., platinum oxide, or as finely divided metal catalysts. Nickel and cobalt catalysts are suitably used as Raney metals, whereas nickel can also be employed on kieselguhr or pumice as the support.

Hydrogenation can be conducted at room temperature and normal pressure, or also at elevated temperature and/or elevated pressure. Preferably, the reaction is conducted under pessures of 1–100 atmospheres and at temperatures from −10 to +150° C. Suitably, the process is conducted in the presence of a solvent, such as methanol, ethanol, isopropanol, tert.-butanol, ethyl acetate, dioxane, glacial acetic acid, tetrahydrofuran, or water. In some cases, it is advantageous to add catalytic amounts of minerl acid, for example, hydrochloric and sulfuric acid. If a compound of Formula II having a basic nitrogen atom is employed as a starting material, the free base or a salt thereof can be employed.

Preferably, the reaction is conducted under normal pressure, the reaction being terminated after the stoichiometric quantity of hydrogen has been absorbed. If starting materials of Formula II are used wherein phenolic hydroxy groups are protected by benzyl groups, these protective groups can be removed during the hydrogenation.

In the thus-obtained products, functionally modified hydroxy groups can be liberated, if desired, by hydrolysis or hydrogenolysis. For example, esterified hydroxy groups can be hydrolyzed in a basic, neutral, or acidic medium. Preferred bases are aqueous, aqueous-alcoholic, or alcoholic sodium or potassium hydroxide; and preferred acids are mainly hydrochloric acid and sulfuric acid.

Hydroxy groups which are etherified in the manner of an acetal can be acid-hydrolyzed. Benzyl ethers can be split hydrogenolytically preferably by means of hydrogen on a platinum or palladium catalyst in the presence of an inert solvent, such as methanol, ethanol, ethyl acetate, or acetic acid. Normally, the hydrogenolysis of benzyloxy groups present in the compound of Formula II is conducted in one step, together with the hydrogenation of the double bond. Benzyl ethers can also be split by acid hydrolysis, for example, with hydrochloric acid/ glacial acetic acid.

It is also possible to alkylate or acylate free hydroxy groups. A special case of an alkylation is represented by the esterification of a compound of Formula I wherein $R_2$ and/or $R_3$ is —OCH$_2$COOH.

The etherification can be conducted, for example, by reaction with corresponding alkyl halogenides, sulfates, or lower alkyl esters in the presence of an alkali, such as sodium or potassium hydroxide or cabonate, it also being possible to add one of the conventional inert solvents, such as acetone or methylethyl ketone. Important is the conversion of phenolic hydroxy groups into constituents of the formula —O—(CH$_2$)$_n$—NR$_4$R$_5$ or —OCH$_2$COZ. Correspondingly, the phenolic starting compounds can be reacted, for example, with dimethyl sulfate, methyl-, ethyl-, propyl-, isopropyl-, n-butyl-, isobutyl-, amyl-, isoamyl-, hexyl-, or isohexyl halogenides; 2-dialkylaminoethyl-, such as 2-dimethylaminoethyl-, 2-diethylaminoethyl-, or 2-methylethylaminoethyl halogenides; 2-pyrrolidinoethyl-, 2-piperidinoethyl-, 2-morpholinoethyl-, or 3-dialkylaminopropyl halogenides, such as 3-dimethylaminopropyl-, 3-diethylaminopropyl-, 3-pyrrolidinopropyl-, 3-piperidinopropyl-, or 3-morpholinopropyl halogenides, or with the corresponding alcohols. Suitable halogenides are the chlorides, bromide, or iodides. The starting materials are the corresponding alkali phenolates (sodium or potassium phenolates). However, it is also possible to react the free phenols with the corresponding alcohols or substituted amino alcohols, in the presence of acidic catalysts, such as sulfuric acid, phosphoric acid, or p-toluenesulfonic acid. The residue —OCH$_2$COZ can be introduced by etherification of the phenolic OH groups with bromoacetic acid or chloroacetic acid, or the derivatives thereof. In addition to the free acids, particularly suitable for this purpose are the corresponding methyl and ethyl esters, amides, and dialkylamides, such as, for example, chloroacetic acid methyl or ethyl ester, chloroacetamide, and N,N-diethyl-chloroacetamide.

The hydroxy groups can be acylated by heating with an anhydride or halogenide of, for instance, acetic propionic, butyric, isobutyric, valeric, isovaleric, or caproic acid, advantageously in the presence of a base, such as pyridine, or an alkali metal salt of the corresponding acid. Acylation is likewise facilitated by the addition of a small amount of a mineral acid, such as sulfuric acid or hydrochloric acid. Phosphoric acid esters are advantageously obtained by esterification with phosphorus oxychloride in pyridine, and sulfuric acid esters are obtained by reaction with sulfamic acid in pyridine and subsequent alkali hydrolysis.

Esterification reactions of the carboxymethoxy groups are conducted in a conventional manner by reaction with the corresponding alcohol, such as methanol, ethanol, propanol, isopropanol, butanol, isobutanol, sec.-butanol, tert.-butanol, amyl alcohol, isoamyl alcohol, n-hexanol, or isohexanol, in the presence of an acid, for example, sulfuric acid, hydrochloric acid, or p-toluenesulfonic acid. In this connection, an additional inert solvent can be present, such as benzene, toluene, methylene chloride, or dichloroethane; and the water formed during this reaction is advantageously removed by azeotropic distillation. Of course, esterification can also be accomplished with diazoalkanes, for example, diazomethane, in ether, tetrahydrofuran, or dioxane.

An amino derivative obtained in accordance with this invention can be converted into the corresponding acid addition salt thereof in a conventional manner by treatment with an acid. For such a reaction, suitable acids are those yielding physiologically acceptable salts. Thus, there can be employed organic and inorganic acids, such as, for example, aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, ethanedisulfonic acid, β-hydroxy-ethanesulfonic acid, p-toluenesulfonic acid, naphthalene-mono- and -di-sulfonic acids, sulfuric acid, nitric acid, hydrohalic acids, such as hydrochloric, hydrobromic, or hydriodic acid, or phosphoric acids, such as orthophosphoric acid.

Conversely, it is possible to convert those compounds of Formula I wherein $R_2$ and/or $R_3$ are —$OSO_3H$ or —$OPO_3H_2$ in a conventional manner into the corresponding ester salt (metal or ammonium salt) thereof by treatment with a base. For these reactions, all bases are suitable which yield physiologically acceptable salts. Thus, organic or inorganic bases can be employed, such as sodium hydroxide, potassium hydroxide, calcium hydroxide, ammonia, and mono-, di-, and triethanolamine.

Isoflavanes of Formula I containing basic groups can also be converted into the physiologically acceptable ammonium compounds thereof by treatment with alkylating agents of preferably 1–8 carbon atoms. Typical alkylating agents are methyl chloride, bromide, and iodide; dimethyl sulfate; ethyl chloride, bromide, and iodide; n-propyl chloride, bromide, and iodide; and n-butyl chloride, bromide, and iodide.

According to this invention, preferred sub-generic groups of compounds are the following, as well as the salts, acid addition esters, and quaternary compounds thereof:

(a) The compounds of Formula I wherein $R_1$ represents H, $CH_3$, or $C_2H_5$; $R_2$ and $R_3$, being the same or different, each represents H, OH, $OCH_3$, acyloxy of 1–6 carbon atoms, 2-dimethylaminoethoxy, 2-diethylaminoethoxy, 2 - pyrrolidino-ethoxy, 2 - piperidinoethoxy, —$OSO_3H$, —$OPO_3H_2$, or —$OCH_2COZ$; and Z represents OH, $OCH_3$, $OC_2H_5$, $NH_2$, diethylamino, pyrrolidino, piperidino, or morpholino;

(b) The compounds of Formula I wherein $R_1$ represents H, $CH_3$, or $C_2H_5$; $R_2$ represents H, OH, $OCH_3$, acyloxy of 1–6 carbon atoms, —$OSO_3H$, —$OPO_3H_2$, or —$OCH_2COZ$; $R_3$ represents H, OH, $OCH_3$, acyloxy of 1–6 carbon atoms, 2-dimethylaminoethoxy, 2-diethylaminoethoxy, 2-piperidinoethoxy, or 2-pyrrolidinoethoxy; and Z represents OH, $OCH_3$, $OC_2H_5$, $NH_2$, diethylamino, pyrrolidino, piperidino, or morpholino;

(c) Compounds as in (b) above wherein X and Y both represent hydrogen; and (d) The compounds of Formula I wherein $R_1$, X, and Y represent hydrogen; $R_2$ represents OH, $OCH_3$, or acyloxy of 1–6 carbon atoms; and $R_3$ represents H, OH, $OCH_3$, acyloxy of 1–6 carbon atoms, 2-dimethylaminoethoxy, 2-diethylaminoethoxy, 2-piperidinoethoxy, or 2-pyrrolidinoethoxy.

The novel compounds can be employed with conventional pharmaceutical excipients. Carrier substances can be such organic or inorganic compounds suitable for parenteral, enteral, or topical application and which do not react with the novel compounds, such as, for example, water, vegetable oils, polyethylene glycols, gelatin, lactose, amylose, magnesium stearate, talc, Vaseline, cholesterol, etc. For parenteral application, particularly oily or aqueous solutions, as well as suspensions, emulsions, or implants are employed.

For enteral application, furthermore, suitable are tablets or dragees which are also characterized by the presence of a carbohydrate carrier or binder. A syrup or the like can also be used wherein a sweetened vehicle is employed.

For topical application salves or creams are used which can, if desired, be sterilized or mixed with auxiliary substances, such as preservatives, stabilizers, or wetting agents, or salts for influencing the osmotic pressure, or with buffer substances.

The novel 3,4-cis-aryl-isoflavane derivatives are administered in effective amounts to mammals, preferably in dosages of 0.1–500 mg. per dosage unit. In such pharmaceutical compositions it is even more preferred to employ a dosage of 0.1–100 mg. per dosage unit and a carrier in an amount of 1–5,000 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In 150 ml. ethyl acetate, 1 g. of 4-(p-anisyl)-7-methoxy-3-isoflavene are hydrogenated with 1 g. of prereduced 5% palladium charcoal. After 230 minutes, 1 mol of hydrogen has been absorbed; the hydrogenation reaction practically comes to a stop. The catalyst is removed by filtration, and the filtrate is freed from solvent under reduced pressure. By recrystallization from ether, there is obtained 3,4-cis-4-(p-anisyl)-7-methoxy-isoflavane, M.P. 167° C.

EXAMPLE 2

(a) In a Parr apparatus, 1 g. of 4-phenyl-7-acetoxy-3-isoflavene in 150 ml. methanol are agitated with 100 mg. platinum oxide at room temperature and a hydrogen pressure of 2 atmospheres, overnight. The catalyst is removed by filtration, and the reaction mixture is concentrated by evaporation and recrystallized from ether/petroleum ether; there is obtained 3,4-cis-4-phenyl-7-acetoxy-isoflavane, M.P. 145–147° C.

Analogously, 3,4-cis-4-phenyl-7-hydroxy-isoflavane can be obtained from 4-phenyl-7-hydroxy-3-isoflavene.

(b) 100 mg. of 3,4-cis-4-phenyl-7-acetoxy-isoflavane are boiled for 2 hours with 10 ml. 2 N methanolic potassium hydroxide solution. The solution is concentrated and acidified with dilute hydrochloric acid, there being likewise obtained 3,4-cis-4-phenyl-7-hydroxy-isoflavane.

EXAMPLE 3

In 75 ml. ethyl acetate, 0.5 g. 4-(p-benzyloxyphenyl)-3-isoflavene (obtained by heating 4-(p-benzyloxyphenyl)-4-hydroxy-isoflavane with sulfuric acid/dioxane) are agitated at room temperature and normal pressure with hydrogen, on 0.5 g. pre-reduced 5% palladium charcoal. The reaction mixture is filtered off, concentrated, and chromatographed on silica gel. By elution with benzene, 3,4 - cis - 4-(p-hydroxyphenyl)-isoflavane, M.P. 151–152° C., is obtained; acetate, M.P. 211–212° C.

EXAMPLE 4

0.5 g. crude 3,4-cis-4-phenyl-7-hydroxy-isoflavane are boiled, under a nitrogen atmosphere, with 0.3 g. chloroacetic acid ethyl ester and 0.35 g. anhydrous potassium carbonate in 10 ml. acetone, for 24 hours. The acetone is distilled off, and the reaction mixture is worked up in a conventional manner with water and methylene chloride; 3,4-cis-4-phenyl-7-(carbethoxymethoxy)-isoflavane is obtained.

EXAMPLE 5

1 g. 3,4-cis-4-phenyl-7-hydroxy-isoflavane are heated with 5 ml. pyridine and 5 ml. acetic anhydride for 5 hours to 50° C. After cooling, the reaction mixture is worked up in a conventional manner with water and chloroform, there being obtained 3,4-cis-4-phenyl-7-acetoxy-isoflavane, M.P. 145–147° C.

EXAMPLE 6

To a solution of 2.1 ml. phosphorus oxychloride in 21 ml. absolute pyridine, there is added under stirring at 5° C. and within 15 minutes, 0.78 g. 3,4-cis-4-phenyl-7-hydroxy-isoflavane, dissolved in 10 ml. pyridine. The reaction solution is allowed to stand overnight at room temperature and is then poured onto a mixture of 300 g. ice and 30 ml. concentrated hydrochloric acid; thereafter, the mixture is heated for 90 minutes on a steam bath. After cooling, the reaction mixture is extracted with ethyl acetate, the extracts are washed with 1 N hydrochloric acid, dried with sodium sulfate, filtered, and evaporated to dryness. There is obtained 3,4-cis-4-phenyl-7-hydroxy-isoflavane-7-orthophosphate.

EXAMPLE 7

At 90° C. and under stirring, 600 mg. sulfamic acid and then 0.75 g. 3,4-cis-4-phenyl-7-hydroxy-isoflavane are suspended in 5 ml. absolute pyridine. The mixture is stirred for 90 minutes on a steam bath, cooled, filtered, washed with pyridine, and the filtrate is mixed several times with absolute ether and decanted. The residue is dried under vacuum, mixed with 7 ml. 12% sodium hydroxide solution and 5 ml. pyridine, and shaken for 5 minutes. The (upper) pyridine phase is washed several times with ether, then diluted with methanol, and evaporated to dryness. The thus-obtained 3,4-cis-4-phenyl-7-hydroxy-isoflavane-7-sulfate sodium salt is recrystallized from methanol.

EXAMPLE 8

0.2 g. of 3,4 - cis - 4 - phenyl - 7 - (carbethoxymethoxy)-isoflavane are refluxed for 3 hours with 3 ml. 2 N ethanolic potassium hydroxide solution. Upon acidifying the solution with dilute sulfuric acid, there is obtained 3,4-cis-4-phenyl-7-(carboxymethoxy)-isoflavane.

EXAMPLE 9

0.5 g. of 3,4 - cis - 4 - (p - hydroxyphenyl) - isoflavane and 2 g. 2 - pyrrolidinoethyl chloride are boiled for 20 hours, under stirring, with 0.6 g. anhydrous potassium carbonate in 25 ml. absolute acetone. The reaction mixture is concentrated, water and ether are added thereto, the layers are separated, dried over potassium hydroxide, concentrated by evaporation, and chromatographed on aluminum oxide. Elution with chloroform yields 3,4-cis-4-(p-2-pyrrolidinoethoxyphenyl)-isoflavane.

EXAMPLE 10

0.2 g. of 3,4 - cis - 4 - p - (2 - pyrrolidinoethoxyphenyl)-isoflavane are dissolved in a small amount of ethanol and mixed with an excess of ethanolic hydrochloric acid. The precipitating hydrochloride of the base is isolated by filtration.

EXAMPLE 11

0.2 g. of 3,4 - cis - 4 - p - (2 - pyrrolidinoethoxyphenyl)-isoflavane are dissolved in ether and mixed with an excess of methyl iodide. The reaction mixture is allowed to stand at room temperature for 24 hours, is then vacuum-filtered, and the thus-obtained methoiodide is purified by crystallization from methanol.

EXAMPLE 12

Analogously to Example 1, the following 3,4-cis-isoflavanes are obtained by hydrogenation of the corresponding 3-isoflavenes:

4-phenyl-, M.P. 90–92° C.,
4-anisyl-, M.P. 98–100° C.,
4-(p-2-diethylaminoethoxyphenyl)-, B.P. 200° C. /1 mm.,
2-methyl-4-phenyl-,
2-ethyl-4-phenyl-,
4-phenyl-2'-fluoro-,
2-phenyl-4'-fluoro-,
4-phenyl-7-methoxy-,
2-methyl-4-phenyl-7-methoxy-,
2-ethyl-4-phenyl-7-methoxy-,
4-phenyl-7-methoxy-2'-fluoro-,
2-methyl-4-phenyl-7-hydroxy-,
2-ethyl-4-phenyl-7-hydroxy-,
4-methyl-4-phenyl-7-carbethoxymethoxy-,
2-ethyl-4-phenyl-7-carbethoxymethoxy-,
4-phenyl-7-carbomethoxymethoxy-,
2-methyl-4-phenyl-7-carbomethoxymethoxy-,
2-ethyl-4-phenyl-7-carbomethoxymethoxy-,
4-phenyl-7-carboxymethoxy-,
2-methyl-4-phenyl-7-carboxymethoxy-,
2-ethyl-4-phenyl-7-carboxymethoxy-,
4-phenyl-7-diethylcarbomoylmethoxy-,
2-methyl-4-phenyl-7-diethylcarbamoylmethoxy-,
2-ethyl-4-phenyl-7-diethylcarbamoylmethoxy-,
4-phenyl-7-pyrolidinocarbonylmethoxy-,
2-methyl-4-phenyl-7-pyrrolidinocarbonylmethoxy-,
2-ethyl-4-phenyl-7-pyrrolidinocarbonylmethoxy-,
2-methyl-4-phenyl-7-acetoxy-,
2-ethyl-4-phenyl-7-acetoxy-,
2-methyl-4-anisyl-,
2-ethyl-4-anisyl-,
4-anisyl-2'-fluoro-,
4-anisyl-4'-fluoro-,
2-methyl-4-anisyl-7-methoxy-,
2-ethyl-4-anisyl-7-methoxy-,
4-anisyl-7-methoxy-2'-fluoro-,
4-anisyl-7-hydroxy-,
2-methyl-4-anisyl-7-hydroxy-,
2-ethyl-4-anisyl-7-hydroxy-,
4-anisyl-7-carbethoxymethoxy-,
2-methyl-4-anisyl-7-carbethoxymethoxy-,
2-ethyl-4-anisyl-7-carbethoxymethoxy-,
4-anisyl-7-carbomethoxymethoxy-,
2-methyl-4-anisyl-7-carbomethoxymethoxy-,
2-ethyl-4-anisyl-7-carbomethoxymethoxy-,
4-anisyl-7-carboxymethoxy-,
2-methyl-4-anisyl-7-carboxymethoxy-,
2-ethyl-4-anisyl-7-carboxymethoxy-, 4-anisyl-7-diethylcarbamoylmethoxy-,
2-methyl-4-anisyl-7-diethylcarbamoylmethoxy-,
2-ethyl-4-anisyl-7-diethylcarbamoylmethoxy-,
4-anisyl-7-pyrrolidinocarbonylmethoxy-,
2-methyl-4-anisyl-7-pyrrolidinocarbonylmethoxy-,
2-ethyl-4-anisyl-7-pyrrolidinocarbonylmethoxy-,
4-anisyl-7-acetoxy-,
2-methyl-4-anisyl-7-acetoxy-,
2-ethyl-4-anisyl-7-acetoxy-,
4-(p-2-dimethylaminoethoxyphenyl)-,
2-methyl-4-(p-2-dimethylaminoethoxyphenyl)-,
2-ethyl-4-(p-2-dimethylaminoethoxyphenyl)-,
4-(p-2-dimethylaminoethoxyphenyl)-2'-fluoro-,
4-(p-2-dimethylaminoethoxyphenyl)-4'-fluoro-,
4-(p-2-dimethylaminoethoxyphenyl)-7-methoxy-,
2-methyl-4-(p-2-dimethylaminoethoxyphenyl)-7-methoxy-,
2-ethyl-4-(p-2-dimethylaminoethoxyphenyl)-7-methoxy-,
4-(p-2-dimethylaminoethoxyphenyl)-7-methoxy-2'-fluoro,
4-(p-2-dimethylaminoethoxyphenyl)-7-hydroxy-,
2-methyl-4-(p-2-dimethylaminoethoxyphenyl)-7-hydroxy-,
2-ethyl-4-(p-2-dimethylaminoethoxyphenyl)-7-hydroxy-,
4-(p-2-dimethylaminoethoxyphenyl)-7-carbethoxymethoxy-,
2-methyl-4-(p-2-dimethylaminoethoxyphenyl)-7-carbethoxymethoxy-,
2-ethyl-4-(p-2-dimethylaminoethoxyphenyl)-7-carbethoxymethoxy-,
4-(p-2-dimethylaminoethoxyphenyl)-7-diethylcarbamoylmethoxy-,
2-methyl-4-(p-2-dimethylaminoethoxyphenyl)-7-diethylcarbamoylmethoxy-,
2-ethyl-4-(p-2-dimethylaminoethoxyphenyl)-7-diethylcarbamoylmethoxy-,
4-(p-2-dimethylaminoethoxyphenyl)-7-acetoxy-,
2-methyl-4-(p-2-dimethylaminoethoxyphenyl)-7-acetoxy-,
2-ethyl-4-(p-2-dimethylaminoethoxyphenyl)-7-acetoxy-,
2-methyl-4-(p-2-diethylaminoethoxyphenyl)-,
2-ethyl-4-(p-2-diethylaminoethoxyphenyl)-,
4-(p-2-diethylaminoethoxyphenyl)-7-methoxy-,
2-methyl-4-(p-2-diethylaminoethoxyphenyl)-7-methoxy-,
2-ethyl-4-(p-2-diethylaminoethoxyphenyl)-7-methoxy-,
4-(p-2-diethylaminoethoxyphenyl)-7-hydroxy-,
2-methyl-4-(p-2-diethylaminoethoxyphenyl)-7-hydroxy-,
2-ethyl-4-(p-2-diethylaminoethoxyphenyl)-7-hydroxy-,
2-methyl-4-(p-2-pyrrolidinoethoxyphenyl)-,
2-ethyl-4-(p-2-pyrrolidinoethoxyphenyl)-,
4-(p-2-pyrrolidinoethoxyphenyl)-7-methoxy-,
2-methyl-4-(p-2-pyrrolidinoethoxyphenyl)-7-methoxy-,
2-ethyl-4-(p-2-pyrrolidinoethoxyphenyl)-7-methoxy-,
2-methyl-4-p-hydroxyphenyl-,
2-ethyl-4-p-hydroxyphenyl-,
4-p-hydroxyphenyl-2'-fluoro-,
4-p-hydroxyphenyl-4'-fluoro-,
4-p-hydroxyphenyl-7-methoxy-,
2-methyl-4-p-hydroxyphenyl-7-methoxy-,
2-ethyl-4-p-hydroxyphenyl-7-methoxy-,
4-p-hydroxyphenyl-7-methoxy-2'-fluoro-,
4-p-hydroxyphenyl-7-methoxy-4'-fluoro-, as well as the orthophosphoric acid esters and the sodium salts of the acidic esters of sulfuric acid of the above-mentioned hydroxy-isoflavanes.

By hydrogenation of the acid addition salts (particularly the hydrochlorides) of the corresponding amino-3-isoflavenes, there are obtained the acid addition salts (particularly the hydrochlorides) of the above-mentioned amino-isoflavanes, which are also obtainable analogously to Example 10.

The quaternary ammonium salts (particularly the methoiodides) of the above-mentioned amino-isoflavanes can be produced according to Example 11, in an analogous manner.

The following examples cover suitable pharmaceutical compositions which can be prepared according to conventional standards.

EXAMPLE A.—TABLETS

|  | Mg. |
|---|---|
| 3,4-vis-4-phenyl-7-acetoxy-isoflavane | 2 |
| Lactose | 130 |
| Corn starch | 50 |
| Talc | 15 |

EXAMPLE B.—COATED TABLETS

|  | Mg. |
|---|---|
| 3,4-cis-4-phenyl-7-acetoxy-isoflavane | 2 |
| Lactose | 120 |
| Talc | 12 |

The coating consists of a mixture of cane sugar, talc, wheat starch, and tragacanth and weighs about 100 mg.

EXAMPLE C.—HARD GELATINE CAPSULES

Each hard gelatine capsule is filled with a fine powder consisting of

|  | Mg. |
|---|---|
| 3,4-cis-4-phenyl-7-acetoxy-isoflavane | 2 |
| Lactose | 180 |
| Talc | 16 |
| Magnesium stearate | 2 |

EXAMPLE D.—SOLUTION FOR INJECTIONS

A solution of 200 g. of 3,4-cis-4-(p-2-pyrrolidinoethoxyphenyl)-7-methoxy-isoflavane hydrochloride in 199.8 litres of distilled water is prepared and filled into 2 ml. ampoules in such a manner that each ampoule contains 2 mg. of the active ingredient.

EXAMPLE E.—SIRUP

The unit dosage contains:

|  | Mg. |
|---|---|
| 3,4-cis-4-phenyl-7-acetoxy-isoflavane | 2 |
| Cane sugar | 300 |
| Glycerol (twice distilled) | 500 |
| Methyl p-hydroxybenzoate | 4 |
| Propyl p-hydroxybenzoate | 2 |
| Flavorings, as desired. |  |
| Water (distilled) | 4,150 |

Instead of the compounds mentioned, other compounds embraced by Formula I as well as their physiologically compatible acid addition salts, ester salts, or quaternary ammonium salts can be incorporated into similar pharmaceutical preparations.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of a 3,4-cis-4-aryl isoflavane of the formula:

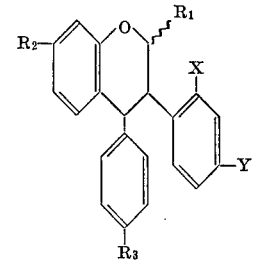

wherein
$R_1$ represents H or alkyl of 1–3 carbon atoms;
$R_2$ represents H, OH, alkoxy of 1–6 carbon atoms, alkanoyloxy of 1–6 carbon atoms, picolinoyloxy, nicotinoyloxy, isonicotinoyloxy, $-OSO_3H$, $-OPO_3H_2$, or $-OCH_2COZ$;

$R_3$ represents hydrogen;

X and Y each represents H or F;

Z represents OH, alkoxy of 1–6 carbon atoms, $NH_2$, alkylated amino of 1–6 carbon atoms, pyrrolidino, piperidino or morpholino;

a physiologically acceptable acid addition salt thereof;

a physiologically acceptable metallic or ammonium ester salt of said member wherein $R_2$ is $-OSO_3H$ or $-OPO_3H_2$.

2. A member as defined by claim 1 wherein X and Y represent hydrogen.

3. A member as defined by claim 1 wherein $R_1$, X and Y represent hydrogen; and $R_2$ represents OH, alkoxy or alkanoyloxy of respectively 1–6 carbon atoms.

4. A member as defined by claim 1 wherein $R_1$, X and Y represent hydrogen; and $R_2$ represents OH, methoxy or acetoxy.

5. A member as defined by claim 1 wherein said member is 3,4-cis-4-phenyl-7-hydroxy-isoflavane.

6. A member as defined by claim 1 wherein said member is 3,4-cis-4-phenyl-7-acetoxy-isoflavane.

7. A member as defined by claim 1 wherein said member is 3,4-cis-4-phenyl-7-methoxy-isoflavane.

References Cited

UNITED STATES PATENTS

| | | | |
|---|---|---|---|
| 3,340,276 | 9/1967 | Carney et al. | 260—345.2 |
| 3,433,805 | 3/1969 | Kramer et al. | 260—345.2 XR |
| 3,436,393 | 4/1969 | De Wald | 260—345.2 XR |

OTHER REFERENCES

Bradbury, Australian J. Chem. vol. 6, pp. 447–9 (1953) QD 1.A9.

HENRY R. JILES, Primary Examiner

J. M. FORD, Assistant Examiner

U.S. Cl. X.R.

260—246, 247.1, 247.2, 247.5, 247.7, 293.4, 294, 294.7, 326.3, 326.5; 424—283